United States Patent [19]

Dieckmann

[11] 4,029,618

[45] June 14, 1977

[54] VINYL HALIDE STABILIZER COMPOSITIONS OF ANTIMONY ORGANIC SULFUR-CONTAINING COMPOUNDS AND ORTHO-DIHYDRIC PHENOLS

[75] Inventor: Dale J. Dieckmann, Euclid, Ohio

[73] Assignee: Dart Industries Inc., Los Angeles, Calif.

[22] Filed: June 30, 1975

[21] Appl. No.: 592,038

[52] U.S. Cl. .................. 260/23 XA; 260/45.75 B; 260/45.95 R
[51] Int. Cl.² ........................................ C08K 5/59
[58] Field of Search ............ 260/45.75 B, 45.95 R, 260/23 XA; 252/406

[56] References Cited

UNITED STATES PATENTS

| | | | |
|---|---|---|---|
| 2,604,458 | 7/1952 | Havens | 260/45.95 R |
| 2,684,956 | 7/1954 | Weinberg et al. | 260/45.75 B |
| 3,285,868 | 11/1966 | Hecker et al. | 260/45.95 R |
| 3,399,220 | 8/1968 | Remes et al. | 260/45.75 B |

OTHER PUBLICATIONS

Modern Plastics – Dec. 1949, pp. 111, 112, 114, 116, 156, 157, 158, 159, 160 and 161–Lally et al.

*Primary Examiner*—V.P. Hoke
*Attorney, Agent, or Firm*—Wood, Herron & Evans

[57] ABSTRACT

A vinyl halide resin stabilizer composition which essentially contains:
  a. an antimony organic sulfur-containing compound, for example, antimony alkyl mercaptides, antimony mercaptoacid esters and the like, and
  b. an ortho-dihydric phenol, such as catechol, t-butyl catechol and 2,3-dihydroxy naphthalene.

These compositions synergistically contribute to the heat stability of vinyl halide resin compositions and offer significant heat stabilization economies. Early color as well as long term heat stability performances of antimony organic compounds are improved in the compositions disclosed thereby permitting the reduction in amounts of such compounds needed for stabilization. Stabilizer compositions which are liquids and shelf-stable at ambient temperatures are also disclosed.

20 Claims, No Drawings

VINYL HALIDE STABILIZER COMPOSITIONS OF ANTIMONY ORGANIC SULFUR-CONTAINING COMPOUNDS AND ORTHO-DIHYDRIC PHENOLS

BACKGROUND OF THE INVENTION

Antimony mercaptides have been proposed as stabilizers for vinyl halide resins to guard against degradation by heat during molding and working of the resin into useful articles. Prior art patents which disclose such antimony organic sulfur-containing compounds and their utility as stabilizers include U.S. Pat. Nos. 2,680,726; 2,684,956; 3,340,285; 3,399,220; 3,466,261 and 3,530,158. In past commercial practice, however, the antimony mercaptides have not been widely used as stabilizers because of various shortcomings including, for example, their propensity to exude from molded or worked PVC plastic stock, cost or lack of other advantages associated with their use which might outweigh such shortcomings. My U.S. Pat. No. 3,887,508 is directed to improvements in the utilization of antimony organic sulfur-containing compounds in combination with metal carboxylates. As described in my U.S. Pat. No. 3,887,508, the utility and efficiency of such antimony compounds are improved in the heat stabilization of vinyl halide resins to an unexpected degree.

SUMMARY OF THE INVENTION

The present invention is directed to further improvements in vinyl halide resin stabilizer systems of antimony organic sulfur-containing compounds. This invention in one of its aspects provides for synergistic heat stabilizer compositions of such antimony compounds as stabilizers and ortho-dihydric phenols. It has been found that early color heat performances of antimony organic sulfur-containing compounds are significantly improved according to the principles of this invention by their combination with ortho-dihydric phenols. Furthermore, improvements in long term heat stability are achievable along with early color heat improvements. In another of its significant features, antimony organic heat stabilizer compositions are provided which are liquids are shelf-stable at ambient temperatures. Such stable liquid compositions are easily formulated into vinyl halide resin systems and offer synergistically heat stabilized resin systems with enhanced resistance to both early discoloration and long term heat degradation of molded plastics. These and other advantages will become apparent in the following detailed description.

This invention is predicated in part upon the unexpected heat stabilization of vinyl halide resins by antimony organic sulfur-containing compounds in combination with certain phenols. In particular, a phenol selected from the group consisting of o-dihydric phenols and o-dihydric alkyl phenols, and mixtures thereof, and an antimony organic sulfur-containing compound together contribute highly unexpected heat stabilization to a vinyl halide resin. It has been found that synergistic heat stabilizations are provided by such compositions, i.e., the sum of the stabilizing effects of an amount of each components alone upon the resin is exceeded when the same amounts of components are together in the vinyl halide resin formula. Such unexpected results and other advantages are empirically demonstrated in numerous operating examples of this invention, and a further understanding thereof will become apparent in view of the detailed description herein. The synergistic effectiveness is especially exhibited by an enhanced resistance of the resin formula to early discoloration during heating to elevated temperatures of about 300° F. to about 400° F. Also, long term heat stability improvement can be achieved in addition to resistance to early discoloration. "Early color" development is a term well understood in the art and means the time within which the resin formula starts to yellow under the action of heat, either under static oven or dynamic working conditions. Whereas, "long term" heat stability refers to the time within which such resin formula under the action of heat severely darken or degrade to a dark color such as dark red or black.

Liquid antimony stabilizer compositions are also provided by this invention which remain stable during storage at ambient temperature. This is an important feature of this invention. For example, liquid antimony organic sulfur-containing compounds, including antimony mercaptoacid, esters, tend to deteriorate upon standing. Such deterioration is observed by the formation and/or precipitation of solids in the liquid compounds. The precise reasons for this deterioration phenomenon is unknown. Nevertheless, the resulting heterogeneous liquids not only increases the problems of measuring and mixing the antimony compounds into vinyl halide resins for stabilization, but practically speaking, heterogeneity causes a dissolute appearance which reduces the marketability of the antimony stabilizers. According to this invention, the liquid antimony stabilizers are also rendered shelf-stable at ambient temperatures by the incorporation of the ortho-dihydric phenolic component. Thus, the combination of components of this invention provides liquid shelf-stable compositions which heat stabilize vinyl halide resins in a very effective manner.

Broad ranges of components of the stabilizer compositions and components can be employed in this invention. Particularly useful stabilizer compositions of this invention are achieved with a total parts by weight range on the order of about 0.05 to about 5 parts by weight based upon 100 parts by weight (phr) of the vinyl halide resin. A most useful range of total parts by weight of stabilizer composition is on the order of about 0.05 to about 3 phr and this depends upon the desired heat stability in a particular vinyl halide resin composition consistent with other requirements and economies.

There are certain generally preferred weight ratios of the antimony organic sulfur-containing compounds relative to a particular o-dihydric phenol. This will become apparent in view of the detailed operating examples. However, it is to be emphasized that the most desirable weight ratios of each of the essential components of the composition of this invention for a particular application and resin system can be arrived at in accordance with the teachings of this invention. Thus, in its broader aspects, this invention is not limited to weight ratios of components. It has been found that synergistic stabilization levels of a particular o-dihydric phenol and a particular antimony organic sulfur-containing compound will vary as exemplified herein. But, most preferably and in general, the combination of o-dihydric phenol with the antimony organic sulfur-containing compound is utilized at total parts on the order of about 0.05 to about 3 phr; and where the o-dihydric phenol is from about 1 to about 10 percent by weight of the antimony compound.

ANTIMONY ORGANIC SULFUR-CONTAINING COMPOUND

The antimony organic sulfur-containing compounds which are of use in this invention are generally characterized as having the Sb — S group or linkage. Generally, most antimony organic compounds suitable for use in this invention are derived from trivalent antimony and include mercaptides which may be characterized by the following formula:

Formula I. $Sb(SR)_3$ wherein R represents hydrocarbon or substituted hydrocarbon radicals such as those selected from the group consisting of alkyl, aryl or aralkyl. Examples of such groups are alkyls such as ethyl, propyl, butyl, octyl, nonyl, lauryl and octadecyl; aryls and aralkyls such as phenyl, benzyl, naphthyl, xylyl or phenyl ethyl and the like. The group SR of Formula I, for instance, may be the rest of a mercaptan or mercapto alcohol. As indicated, aliphatic and aromatic mercaptans may be employed to form the group SR. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, and others. As examples of suitable mercapto alcohols, monothioethylene glycol, monothipropylene glycol, thioglycerol, thiodiethylene glycol, and others may be mentioned. Specific examples of such antimony mercaptides are antimony trilaurylmercaptide, antimony triphenylmercaptide and antimony tribenzylmercaptide. Patents exemplifying this formula $Sb(SR)_3$ or a similar formula and a definition of compounds represented thereby include U.S. Pat. Nos. 2,684,956 and 3,466,261, among others.

Antimony organic sulfur-containing compounds other than the antimony mercaptides of the Formula I above, are suitable for use according to this invention. Such compounds are generally termed antimony mercaptoacid ester which may be further defined by the following formula:

Formula II. $Sb(SRCOOR')_3$ wherein R is selected from the group consisting of alkylene, arylene, and aralkylene radicals and R' is a substituted or unsubstituted alkyl, aryl or mixed aryl-alkyl group. Thus R may be derived from mercapto acetic, β-mercaptopropionic, thiomalic, thiosalicyclic acids, etc. Similarly, R' may be derived from decanols, glycerol, glycol, monoesters, dihydroabietyl alcohol, phenoxyethanol, pentaerythritol, etc. Particularly suitable arethe esters of mercapto alcohols, such as thioglycols, in which the hydroxy groups are esterified by an aliphatic, aromatic or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic mercapto acids, such as esters of beta thiopropionic acid, thiolactic acid, thiobutyric acid and mercapto lauric acid. Specific examples of antimony mercaptoacidesters include antimony tris (isooctylthioglycolate), antimony tris (glycoldimercaptoacetate), antimony tris (dodecylthioglycolate), dodecylmercaptoantimony bis(isooctylthioglycolate), and antimony tris(isooctl-β-mercaptopropionate). Patents exemplifying Formula II or a similar formula and a definition of compounds represented thereby include U.S Pat. Nos. 2,680,726 and 3,530,158, among others.

The antimony organic sulfur-containing compounds having the SbS group represented by Formulas I and II come within the scope of a broader characterization illustrated by the following formula:

Formula III. $R_nSbX_{3-n}$ wherein R is selected from the group consisting of alkyl, alkenyl, alkynyl, aryl, cycloalkyl, cycloalkenyl, and mixed aryl-alkyl, and substituted groups thereof, where X is selected from the group consisting of sulfide (sulfur) or mercaptide and n is an integer of 0 to 2. Of course, other X groups are SR and SRCOOR' defined by Formulas I and II above wherein R of the groups SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof. This is also apparent, and with reference to the above incorporated U.S. Pat. No. 3,530,158 patent, that when X is divalent, e.g. sulfide, the compounds may be RSbX as exemplified hereinafter by n-butyl antimony sulfide where $n$ of $R_n$ in Formula III is 1 and where $n$ of $X_{3-n}$ is 2. It is therefore appreciated that the formulas herein are merely representative indicia of the class of antimony compounds which respond to the teachings of this invention. In the compounds, $R_nSbX_{3-n}$ which may be used in practice of this invention, R may be alkyl, cycloalkyl, alkenyl, cycloalkenyl, alkynyl, or aryl including such groups when inertly substituted. When R is alkyl, it may include methyl, ethyl, n-propyl, i-propyl, n-butyl, i-butyl, n-amyl, n-octyl, 2-ethylhexyl, etc. as well as substituted alkyls including phenylethyl, benzyl, etc. Typical alkenyl groups which may be employed may include vinyl, -b 2-propenyl (i.e. allyl), 1-propenyl, 1-butenyl, 2-butenyl, etc. as well as inertly substituted alkenyl groups typified by 4-phenyl, buten-1-yl, etc. Typical cycloalkyl groups may include cyclohexyl, cycloheptyl, cyclooctyl as well as inertly substituted cycloalkyl groups including 2-methyl cycloheptyl, 3-butyl cyclohexyl, 3-methylcyclohexyl, etc. Typical alkynyl groups which may be employed include propyn-1-yl, propyn-2-yl, butyn-1-yl, phenlethynyl, ethynyl, etc. Typical aryl groups which may be employed may include phenyl, tolyl, xylyl, chlorophenyl, dimethylaminophenyl, etc. Where more than one R or X is present in Formula III, such groups may be the same or different. Typical mercaptides include phenyl mercaptide, lauryl mercaptide, butyl mercaptide, or dimercaptides including aliphatic, cycloaliphatic, or aromatic dimercaptans of the R groups disclosedherein, etc. Specific compounds when n is 1 to 2 include n-butyl antimony dilaurylmercaptide, n-butyl antimony sulfide, di-n-butyl antimony lauryl mercaptide, diphenyl antimony lauryl mercaptide, ditolyl antimony n-amyl mercaptide, dibenzyl antimony benzyl mercaptide, diallyl antimony cyclohexyl mercaptide, diphenyl antimony allylmercaptide, dicyclohexyl antimony n-hexyl mercaptide, ditolyl antimony phenyl mercaptide, di-isopropyl antimony 2-ethylhexyl mercaptide, di-p-chlorophenyl antimony n-butyl mercaptide, diphenyl antimony ethyl mercaptoacetate. Patents exemplifing such antimony compounds include U.S. Pat. Nos. 3,530,158 and 3,399,220. Where the R group is aryloxy, alkyloxy, alkaryloxy, acyloxy, etc., specific examples from which this group is derived may include 2-ethylhexanol, phenol, nonylphenol, xylenol, 2-ethylhexoic acid, oleic acid, lauric acid, benzoic acid and the like. Of course, it is apparent that antimony mercaptides, antimony mercapto acids, antimony mercaptoacid ester, etc., per se form no part of this invention and the mentioned patents and their specific disclosures clearly teach these compounds and their method of production to enable anyone of ordinary skill to use them in carrying out this invention.

ORTHO-DIHYDRIC PHENOLS

The terms "phenol" and "phenols" as used herein are intended to include mono- or polynuclear phenols exemplified by the benzene or naphthalene nucleus, and, the alkyl substituted forms of such nucleus. The ortho-dihydric phenols of such mono or polynuclear phenols have been found to provide synergistic stabilizing effectiveness with the antimony organic sulfur-containing compounds. These phenols additionally have been found to provide liquid, shelf-stable compositions of antimony compounds at ambient temperatures. Specific examples of such ortho-dihydric phenols which have presently been found advantageous are catechol, tertiary butyl catechol and 2,3 dihydroxynaphthalene. These specific phenols may be represented by the following structural formula which also characterizes the ortho-dihydroxy phenols according to the broader aspects of this invention:

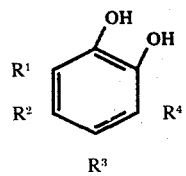

where $R^1$, $R^2$, $R^3$ or $R^4$ is either hydrogen, alkyl, or may be a carbon residue which forms a part of an aromatic or alkylated aromatic nucleus as is the case when the phenolic nucleus is naphthalene. Alkyl substituted groups of mono or polynuclear phenols of this formula include straight or branched chain groups of C , such as methyl, ethyl, propyl, pentyl, hexyl, heptyl, dodecyl, or tertiary butyl, isopropyl, etc., forms. The presently most preferred phenols of this invention are the catechol derivatives because of their best performance and commercial availability. Other monohydric or trihydric phenols, or other functionally substituted mono-, di- or trihydric phenols have not been presently found to provide synergistic resin heat stabilizing activities, For example, other seemingly chemically similar phenols such as gallic acid, pyrogallol, resorcinol, hydroquinone, and nonyl phenol have not been found by me to provide synergistic heat stabilization effects with antimony organic sulfur-containing components. For instance, based upon my findings of synergisms and amounts of components where such synergisms might be found, these other seemingly chemically similar compounds do not display heat stabilizing synergisms with antimony organic sulfur-containingcompounds. In unexpected contrast, however, o-dihydroxyl phenols or alkyl substituted derivatives thereof and the antimony organic sulfur-containing components in combination provide highly unexpected results. Such unexpected results and other unexpected results along with other advantages are empirically demonstrated in numerous operating examples of this invention, and a further understanding thereof will become apparent in view of the detailed description herein.

The principles of this invention and its operating parameters will be further understood with reference to the following detaild examples which serve to illustrate the types of specific materials and their amounts as used in typical vinyl halide resin formulations and the synergisms displayed by the essential combination of components in the stabilizer composition according to this invention. These examples are considered to be exemplary of this invention, and should not be considered as limiting, especially in view of applicant's broad disclosure of principles of this invention.

In Examples 1–11 which follow, a standard resin formula was employed which contained 200 parts by weight of polyvinyl chloride homopolymer which is characterized as a white powder having a particle size such that 100% passes through a 42 mesh screen at a specific gravity of 1.40 (Geon 103 EP by B. F. Goodrich). Included in the standard resin formula is also 6 parts by weight of a processing aid which is an acrylic polymer in powdered form which improves the hot processing of rigid and plasticized vinyl compounds (Acryloid K120N by Rohm and Haas Company). This material is a fine, white free flowing powder having a bulk density at about 0.30 grams per cc and a viscosity, 10% toluene, at 600 cps (Brookfield). The processing aid merely facilitates hot processing and forms no part of this invention. Calcium stearate was also employed at 2 parts by weight in the resin formula. The term "standard resin blank" or just "blank" is used hereinafter in these examples to designate the standard resin formula without heat stabilizer additives. Various combinations of the antimony organic sulfur-containing compounds and phenols were first blended together to form a shelf-stable liquid or solid phase composition and then mixed into the standard resin formula according to the following examples on a parts by weight basis. All amounts of such stabilizer components, in the tables and examples, are on a parts per hundred resin basis, or as indicated above, simply "phr". The phenols were incorporated in the stabilizer composition on the basis of about 5 percent by weight of the antimony compound. This percentage basis of phenol has been found to be satisfactory to stabilize the liquid antimony compounds and render same shelf-stable for indefinite periods at ambient temperatures, for example, several months up to a year or more. However, amounts from about 1 to about 10 or more can be used. The blank resin formula with and without stabilizer additives is tested in the following examples by first milling for 5 minutes at 350 F. to form a uniform polyvinyl chloride composition, after which time long term heat stabilities or early color performances of test samples were determined by oven treatmefit at 375 F. at 5 or 10 minute interval observation of test samples as indicated. The long term heat stability contributions of the stabilizer compositions (or components thereof) hereinafter are determined by ascertaining the number of minutes at the test temperature required for the samples to degrade by severe darkening to a dark red or black. Thus, the term long term "heat stability contribution" is used to indicate the amount of heat stability in minutes contributed by a composition or component to the resin blank formula. Early color performances of the examples were observed as the term was defined above.

EXAMPLES 1–7

In Examples 1–7, the synergistic performances of the combination of several o-dihydric phenols and liquid antimony tris (isooctyl-β-mercaptopropionate), hereinafter "ATP", was demonstrated. Each of the combinations were shelf-stable liquids at ambient temperature. For this purpose, the heat stability of the standard resin blank in the absence of either the antimony organic compound or phenol was determined by milling at 350° F. and long term heat stability testing at 375° F. The standard resin blank was pink or orange off the mill and darkened within about 10 minutes at 375° F. This demonstrated that the blank resin will degrade quickly. This blank was thus given the numerical designation "0" at zero parts of either component. For comparison with the blank, a series of Examples 1–7 in which the standard resin blank was combined with ATP or phenol, alone and in combination, were performed for comparison. The results of these examples are shown in Table I. The times in minutes reported in Table I for darkening or blackening take into account the standard resin blank which degraded within about 10 minutes of heat stability testing. In other words, the time in minutes recorded at various levels for the phenol and ATP alone, and in combination with one another, represent the contribution in minutes of either one or both of these components to the resin blank.

TABLE I

| | Components | 375° F. Heat Stability Contribution |
|---|---|---|
| Example 1 | 0.95 ATP | 40' |
| Example 2 | 0.05 4-tertiary butyl catechol | 0' |
| Example 3 | 0.95 ATP | |
| | 0.05 4-tertiary butyl catechol | 60' |
| Example 4 | 0.05 catechol | 0' |
| Example 5 | 0.95 ATP | |
| | 0.05 catechol | 50' |
| Example 6 | 0.05 2,3 dihydroxynaphthalene | 0' |
| Example 7 | 0.95 ATP | |
| | 0.05 2,3 dihydroxynaphthalene | 60' |

Table I demonstrates that at 0.05 phr of each of the o-dihydric phenols alone, stability of the blank was not improved. In contrast, the ATP alone at about 0.95 phr contributed about 40 minutes of heat stabilizing effectiveness to the blank. Therefore, in general the o-dihydric phenol component of the stabilizer combination does not contribute to the long term heat stability of the blank formula; whereas, ATP contributed to such long term heat stability of the blank.

However, when each of the o-dihydric phenols at 0.05 phr was combined with ATP at 0.95 phr, significant synergism was observed. To illustrate this, reference is made to Example 2 of Table I in which 0.05 part of 4-tertiary butyl catechol alone did not contribute heat stability to the blank. For comparison, in Example 1, 0.95 part of ATP contributed about 40 minutes of heat stability to the blank. Thus, the expected heat stability of a combination of 0.05 phr of the t-butyl catechol and 0.95 ATP should have been about 40 minutes or less. However, as demonstrated by Example 3, the heat stability of such a combination was 60 minutes and heat stability synergism thus was clearly demonstrated. The same synergistic comparisons are made for the combinations of ATP with Catechol or 2,3-dihydroxynaphthalene with reference to Examples 1 and 4–7.

In addition to the long term heat stability improvements, the resistance to early color development by the stabilizer composition of this invention is dramatically demonstrated by Examples 1–7. After milling at 350° F., Example 1 which contained ATP alone had already started to yellow, and this yellowing worsened until, after 40 minutes, the test sample turned dark orange. In contrast, in Examples 3, 5 and 7 which contained the combination of ATP with each o-dihydric phenol, the samples remained essentially colorless during milling and until after about 15 minutes of oven testing. Only after about 20 minutes of oven treatment at 375° F. did the test samples of Examples 3, 5 and 7 start to turn a slight yellow, but even then, not to a degree of yellow exhibited by the ATP Example 1 upon even milling. These examples demonstrated the surprising heat stabilizing effectiveness of the o-dihydric phenol in the combination with an antimony organic sulfur-containing compound to resist early discoloration of vinyl halide resin formulations.

EXAMPLES 8–11

The principles of this invention are further illustrated by employing other antimony organic sulfur-containing compounds and o-dihydric phenols. For these purposes, Examples 8–11 were performed. In these examples antimony tris (laurylmercaptide) was substituted for the antimony tris (isooctylmercaptopropionate) and antimony tris (laurylmercaptide) is designated hereinafter as "ATL". The ATL is a pasty solid at ambient temperatures and the phenolic components were blended therewith prior to the addition of the combination of components to the resin formulas. Because the phenolic component is added generally in a minor amount, it is preferred for good blending to first combine it with the antimony compound rather than add it separately to the resin formula. Furthermore, where shelf-stability is desired as is the case with liquid antimony compounds, the prior addition of the phenolic component has been found to achieve it. Milling and oven testing for heat stability early color peformance was made as above in Examples 1–7. The ATL was employed alone and in combination with the o-dihydric phenols in phr as listed in Table II.

TABLE II

| | Components |
|---|---|
| Example 8 | 0.95 ATL |
| Example 9 | 0.95 ATL |
| | 0.05 4-tertiary butyl catechol |
| Example 10 | 0.95 ATL |
| | 0.05 catechol |
| Example 11 | 0.95 ATL |
| | 0.05 2,3-dihydroxynaphthalene |

After milling at 350° F., Example 8 which contained ATL alone had already yellowed and the yellowing worsened until, after 40 minutes, the test sample turned dark orange. In contrast, in Examples 9–11, which contained the combination of ATL with each o-dihydric phenol, the samples remained essentially colorless during milling and until after about 15 minutes of oven testing. Only after about 20 minutes of oven treatment at 75° F. did the test samples 9–11 start to turn a slight yellow, but even then, not to a degree of yellow exhibited by the ATL alone in Example 8 upon even milling. These examples confirm the early color development resistance provided by the stabilizer of this invention with other antimony organic sulfur-containing compounds.

In Examples 12-27 which follow, a standard resin formula was employed which contained 200 parts by weight of polyvinyl chloride homopolymer (Diamond 450 by Diamond Shamrock). Included in the standard resin formula is also 6 parts by weight of a processing aid which, as stated above, is an acrylic polymer in powdered form which improves the hot processing of rigid and plasticized vinyl compounds. (Acryloid K120N by Rohm and Haas Company). A paraffin wax lubricant, i.e., a commercial wax designated 165 (H. M. Royal, Inc.) was also employed at 0.5 parts by weight in the resin formula. In addition, the resin formula contained 2 parts by weight of calcium stearate and 2 parts by weight of $TiO_2$ as a white pigment. The term standard resin blank or just blank is used hereinafter in these examples to designate the standard resin formula without heat stabilizer additives. Various combinations of the liquid antimony tris (isooctylthioglycolate) i.e. "ATG", and phenols were first blended to form shelf-stable homogeneous liquids containing about 5% by weight of the phenol in the combination. "TBC" means 4-tertiary butyl catechol; "C" means catechol, and "DHN" means 2,3-dihydroxynaphthalene. Then the stabilizer combination were mixed into the standard resin formula according to the following examples on the parts by weight basis. All amounts of such stabilizer components, in the tables and examples, are on a parts per hundred resin basis, or as indicated above, simply phr. The blank resin formula with and without the combination of stabilizer additives are tested in the following examples by first milling the mixtures to form a uniform polyvinylchloride composition for 5 minutes at 350° F., after which the early color performances of test samples were determined by oven treatment at 375° F. as indicated above. Also, separate samples were pressed in a heated press for 5 minutes at 350° F. The early color test results for each of the oven samples at 10, 25 and 40 minutes, and press tests, were rated 1, 2 or 3, according to the best whiteness with the number 1 given to the best whiteness or color, 2 for second best etc. Where there was a tie rating, each sample was accorded the better rating. The results of all these tests and rates, along with the overall numerical ratings for each Example are given in Table III.

TABLE III

| Ex. | Components | Rating at 10' | at 25' | at 40' | Press | Total Rating |
|---|---|---|---|---|---|---|
| 12 | 0.2 ATG | 2 | 2 | 1 | 3 | 8 |
| 13 | 0.2 ATG-TBC | 1 | 1 | 1 | 2 | 5 |
| 14 | 0.2 ATG-C | 1 | 1 | 1 | 1 | 4 |
| 15 | 0.2 ATG-DHN | 1 | 1 | 1 | 2 | 5 |
| 16 | 0.5 ATG | 2 | 2 | 1 | 3 | 8 |
| 17 | 0.5 ATG-TBC | 1 | 1 | 1 | 2 | 5 |
| 18 | 0.5 ATG-C | 1 | 1 | 1 | 1 | 4 |
| 19 | 0.5 ATG-DHN | 1 | 1 | 1 | 2 | 5 |
| 20 | 0.8 ATG | 2 | 3 | 3 | 3 | 11 |
| 21 | 0.8 ATG-TBC | 1 | 1 | 1 | 1 | 4 |
| 22 | 0.8 ATG-C | 1 | 2 | 2 | 1 | 6 |
| 23 | 0.8 ATG-DHN | 1 | 2 | 2 | 2 | 7 |
| 24 | 1.8 ATG | 2 | 3 | 3 | 3 | 11 |
| 25 | 1.8 ATG-TBC | 1 | 1 | 1 | 1 | 4 |
| 26 | 1.8 ATG-C | 1 | 2 | 2 | 1 | 6 |
| 27 | 1.8 ATG-DHN | 1 | 2 | 2 | 2 | 7 |

Examples 12-27 clearly demonstrate that the ATG or antimony tris (isooctylthioglycolate) in combination with either o-dihydric phenol improves the early color performance of the ATG alone. The total whiteness ratings of each of the combinations versus the whiteness rating of the ATG alone is indicative of far superior performance of the combinations. These results are indeed unexpected when one considers the o-dihydric phenols under test and at the same levels alone in the standard blank would not improve the early color of the blank.

EXAMPLES 28-30

Other antimony organic compounds display synergisms with o-dihydric phenols. Dodecylmercaptoantimony bis (isooctylthioglycolate), antimony tris (glycoldimercaptoacetate), or antimony tris (dodecylthioglycolate) are substituted for the antimony organic sulfur-containing compounds of the preceding examples and employing similar procedures, similar synergistic heat stabilizing performances with o-dihydric phenols are demonstrated.

In the above examples, the metal carboxylate, i.e., calcium stearate was employed and it is especially preferred to include such carboxylates in the stabilizer composition of this invention to achieve the advantageous stabilizing effectiveness as fully developed in my issued U.S. Pat. No. 3,887,508, and such disclosure is incorporated herein by reference. The metal carboxylate is an alkali or alkaline earth metal salt of a carboxylic or thiocarboxylic acid. The most useful metal salts of organic acids are those with lubricating characteristics such as the metal salts of fatty acids, more particularly, about $C_8$–$C_{24}$ mono- carboxylic acids such as lauric and stearic acids; saponified synthetic fatty acids of about $C_{24}$–$C_{54}$ such as $C_{36}$ or $C_{54}$ dimer and trimer acids; and partially saponified ester waxes such as Hoechst Wax OP which an ester of montan wax partially saponified with lime, e.g., $C_{28}$–$C_{32}$ carboxylic acids which are partially esterified with a dihydric alcohol and then saponified with lime to produce partially saponified ester waxes. However, although the lubricating metal salts are most useful, nonlubricating carboxylates such as acetates, benzoates or 2-ethyl hexoates are suitable. Specific examples of alkali or alkaline metal carboxylates include sodium stearate, lithium stearate, calcium stearate, calcium laurate, barium laurate, barium stearate, magnesium stearate, and strontium stearate.

In each of the above examples, the vinyl halide resin which was employed is a homopolymer of vinyl chloride, i.e., polyvinyl chloride. It is to be understood, however, that this invention is not limited to a particular vinyl halide resin such as polyvinyl chloride. Other halogen-containing resins which are employed and illustrate the principles of this invention include chlorinate polyethylene, chlorinated polyvinyl chloride and the vinyl halide resin type. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride $H_2C=CHCl$ to polyvinyl chloride $(CH_2—CHCl—)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymer, vinyl chloride-vinylidene copolymers vinyl chloride-propylene copolymers; and the like. Of course, the vinyl halide commonly used in the industry is the chloride, although others such as bromide and fluoride may be used. Examples of the latter polymers include polyvinyl bromide, polyvinyl fluoride, and copolymers thereof.

It is also to be understood that other components such as lubricants, processing aids, plasticizers, fillers, pigments, other stabilizers, other non-halogenated resins, etc., can be incorporated in the resin compositions and the benefits of this invention can be achieved. Accordingly, other modifications will become apparent in view of the teachings herein without departing from the true spirit and scope of this invention.

What is claimed is:

1. A resin heat stabilizer composition which consists essentially of,
    an antimony organic sulfur-containing compound having the formula

where R of the formula is selected from the group consisting of alkyl, alkenyl, alkynyl, aryl, cycloalkyl, cycloalkenyl, mixed aryl-alkyl, and substituted groups thereof, where X of the formula is selected from the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof, where n is an integer of 0 to 2, and
    a phenol selected from the group consisting of o-dihydric phenols and o-dihydric alkyl phenols, and mixtures thereof, said antimony compound and phenol components in relative amounts which together provide a synergistic heat stabilizing effectiveness upon said resin.

2. The composition of claim 1 wherein said phenol is selected from the group consisting of catechol, t-butyl catechol and 2,3-dihydroxynaphthalene.

3. The composition of claim 1 which is liquid and shelf-stable at ambient temperatures.

4. The composition of claim 3 wherein said antimony compound is selected from the group consisting of antimony tris (isoctylthioglycolate), antimony tris (isooctylmercaptopropionate), dodecylmercaptoantimony bis (isooctylthioglycolate), antimony tris (glycoldimercaptoacetate), and mixtures thereof.

5. The composition of claim 3 wherein said phenol is selected from the group consisting of catechol, t-butyl catechol, and 2,3-dihydroxynaphthalene.

6. The composition of claim 1 which includes a metal carboxylate selected from the group consisting of an alkali or alkaline earth metal salt of a carboxylic or thiocarboxylic acid.

7. The composition of claim 6 wherein said acid is a fatty acid.

8. A vinyl halide resin composition which comprises a vinyl chloride resin and, as a heat stabilizer, an effective amount of a composition consisting essentially of,
    an antimony organic sulfur-containing compound having the formula

where R of the formula is selected from the group consisting of alkyl, alkenyl, alkynyl, aryl, cycloalkyl, cycloalkenyl, mixed aryl-alkyl, and substituted groups thereof, wherein X of the formula is selected from the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof, where n is an integer of 0 to 2, and
    a phenol selected from the group consisting of o-dihydric phenols and o-dihydric alkyl phenols, and mixtures thereof, said antimony compound and phenol components in relative amounts which together provide a synergistic heat stabilizing effectiveness upon said resin.

9. The composition of claim 8 wherein said phenol is selected from the group consisting of catechol, t-butyl catechol and 2,3-dihydroxynaphthalene.

10. The composition of claim 8 wherein said vinyl halide resin comprises polyvinyl chloride.

11. The composition of claim 8 wherein the stabilizer composition is liquid and shelf-stable at ambient temperatures.

12. The composition of claim 11 wherein said antimony compound is selected from the group consisting of antimony tris (isooctylthioglycolate), antimony tris (isooctylmercaptopropionate), dodecylmercaptoantimony bis (isooctylthioglycolate), antimony tris (glycoldimercaptoacetate), and mixture thereof.

13. The composition of claim 11 wherein said phenol is selected from the group consisting of catechol, t-butyl catechol, and 2,3-dihydroxynaphthalene.

14. The composition of claim 8 wherein the relative amount of said antimony compound is from about 0.05 to about 3 parts by weight per 100 parts resin and the relative amount of phenol present is from about 1 to about 10 percent by weight of said antimony compound.

15. A vinyl halide resin composition which comprises a vinyl chloride resin and, as a heat stabilizer, an effective amount of a composition consisting essentially of,
    an antimony organic sulfur-containing compound selected from the group consisting of antimony tris (isooctylthioglycolate), antimony tris (laurylmercaptide), antimony tris (isooctylmercaptopropionate), dodecylmercaptoantimony bis (isooctylthioglycolate), antimony tris (glycoldimercaptoacetate), antimony tris (dodecylthioglycolate), and mixtures thereof, and
    a phenol selected from the group consisting of catechol, t-butyl catechol and 2,3-dihydroxynaphthalene, and mixtures thereof, said antimony compound and phenol components in relative amounts which together provide a synergistic heat stabilizing effectiveness upon said resin.

16. The composition of claim 15 wherein said effective tamount is on the order of about 0.05 to about 5 parts by weight per 100 parts resin.

17. The composition of claim 16 wherein the relative amount of said antimony compound is from about 0.05 to about 3 parts by weight per 100 parts resin and the relative amount of phenol present is from about 1 to about 10 percent by weight of said antimony compound.

18. A heat stabilizer composition for imparting a vinyl halide resin with enhanced resistance to early discoloration, said composition being a liquid and shelf-stable at ambient temperature and comprising an antimony mercaptoacid ester and a phenol selected from the group consisting of o-dihydroxy phenols and o-dihydroxyl alkyl phenols.

19. The composition of claim 18 which is in combination with a metal salt of a fatty acid.

20. The composition of claim 19 wherein said salt is calcium stearate.

* * * * *

UNITED STATES PATENT AND TRADEMARK OFFICE
CERTIFICATE OF CORRECTION

PATENT NO. : 4,029,618
DATED : June 14, 1977
INVENTOR(S) : Dale J. Dieckmann

It is certified that error appears in the above-identified patent and that said Letters Patent are hereby corrected as shown below:

Col. 1, line 44, "liquids are" should be --liquids and--

Col. 1, line 56 "o-dihydric" should be --o-dihydric--

Col. 1, line 57 "o-dihydric" should be --o-dihydric--

Col. 1, line 63 "components" should be --component--

Col. 2, line 20 "mercaptoacid, esters" should be --mercaptoacid esters--

Col. 2, line 51 "o-dihydric" should be --o-dihydric--

Col. 2, line 60 "o-dihydric" should be --o-dihydric--

Col. 2, line 64 "o-dihydric" should be --o-dihydric--

Col. 2, line 67 "o-dihydric" should be --o-dihydric--

Col. 3, line 44 "ester" should be --esters--

Col. 3, line 56 "arethe" should be --are the--

Col. 4, line 19 "groups" should be --group--

Col. 4, lines 26 and 27 "U.S. Pat. No. 3,530,158 patent" should be --3,530,158 patent--

Col. 4, line 28 "compounds" should be --compound--

Col. 4, line 42 "vinyl, -b 2-propenyl" should be --vinyl, 2-propenyl--

UNITED STATES PATENT AND TRADEMARK OFFICE
CERTIFICATE OF CORRECTION

PATENT NO. : 4,029,618
DATED : June 14, 1977
INVENTOR(S) : Dale J. Dieckmann

It is certified that error appears in the above-identified patent and that said Letters Patent are hereby corrected as shown below:

Col. 4, line 59 "disclosedherein" should be --disclosed herein--

Col. 4, line 60 "1 to 2" should be --1 or 2--

Col. 5, line 2 "exemplifing" should be --exemplifying--

Col. 5, line 10 "ester" should be --esters--

Col. 5, line 48 "groups₁₂of C" should be --groups of $C_{1-12}$--

Col. 5, line 66 "containingcompounds" should be --containing compounds--

Col. 5, line 67 "o-dihydroxyl" should be --$\underline{o}$-dihydroxyl--

Col. 6, line 10 "detaild" should be --detailed--

Col. 6, line 58 "minutês at 350 F." should be --minutes at 350°F.--

Col. 6, line 61 "treatment at 375 F." should be --treatment at 375°F.--

Col. 7, line 8 "o-dihydric" should be --$\underline{o}$-dihydric--

Col. 7, line 31 "contribution" should be in quotation marks

Col. 7, line 48 "o-dihydric" should be --$\underline{o}$-dihydric--

Col. 7, line 51 "o-dihydric" should be --$\underline{o}$-dihydric--

Col. 7, line 56 "o-dihydric" should be --$\underline{o}$-dihydric--

UNITED STATES PATENT AND TRADEMARK OFFICE
CERTIFICATE OF CORRECTION

PATENT NO. : 4,029,618
DATED : June 14, 1977
INVENTOR(S) : Dale J. Dieckmann

It is certified that error appears in the above-identified patent and that said Letters Patent are hereby corrected as shown below:

Col. 7, line 64 "t-butyl" should be --$\underline{t}$-butyl--

Col. 8, line 2 "Catechol" should be --catechol--

Col. 8, line 13 "o-dihydric" should be --$\underline{o}$-dihydric--

Col. 8, line 20 "demonstrated" should be --demonstrate--

Col. 8, line 21 "o-dihydric" should be --$\underline{o}$-dihydric--

Col. 8, line 29 "o-dihydric" should be --$\underline{o}$-dihydric--

Col. 8, line 47 "o-" should be --$\underline{o}$- --

Col. 8, line 63 "o-dihy-" should be --$\underline{o}$-dihy- --

Col. 8, line 67 "75°F" should be --375°F--

Col. 9, line 20 "standard resin blank" should be in quotation marks

Col. 9, line 20 "just blank" the word "blank" should be in quotation marks

Col. 9, line 29 "combination" should be --combinations--

Col. 9, line 31 "the" should be --a--

Col. 9, line 34 "phr" should be in quotation marks

Col. 9, line 43 "and press" should be --and the press--

Col. 9, line 45 "1" should be in quotation marks

UNITED STATES PATENT AND TRADEMARK OFFICE
CERTIFICATE OF CORRECTION

PATENT NO. : 4,029,618
DATED : June 14, 1977
INVENTOR(S) : Dale J. Dieckmann

It is certified that error appears in the above-identified patent and that said Letters Patent are hereby corrected as shown below:

Col. 9, line 45 "2" should be in quotation marks

Col. 9, line 68 "o-dihydric" should be --o-dihydric--

Col. 10, line 5 "o-dihy-" should be --o-dihy- --

Col. 10, line 11 "o-dihydric" should be --o-dihydric--

Col. 10, line 19 "o-dihydric" should be --o-dihydric--

Col. 10, line 36 "which an" should be --which is an--

Col. 11, line 2 "polymer" should be --polymers--

Col. 11, line 2 "copolymers vinyl" should be --copolymers, vinyl--

Col. 11, line 38 "o-" should be --o- --

Col. 11, line 39 "o-dihydric" should be --o-dihydric--

Col. 11, line 45 "t-butyl" should be --t-butyl--

Col. 11, line 51 "isoctylthioglycolate" should be --isooctylthioglycolate--

Col. 11, line 56 "t-butyl" should be --t-butyl--

Col. 12, line 17 "o-" should be --o- --

Col. 12, line 18 "o-dihydric" should be --o-dihydric--

Col. 12, line 24 "t-butyl" should be --t-butyl--

UNITED STATES PATENT AND TRADEMARK OFFICE
CERTIFICATE OF CORRECTION

PATENT NO. : 4,029,618

DATED : June 14, 1977

INVENTOR(S) : Dale J. Dieckmann

It is certified that error appears in the above-identified patent and that said Letters Patent are hereby corrected as shown below:

Col. 12, line 36 "mixture" should be --mixtures--

Col. 12, line 39 "t-" should be --$\underline{t}$- --

Col. 12, line 58 "t-butyl" should be --$\underline{t}$-butyl--

Col. 12, line 64 "tamount" should be --amount--

Col. 14, line 1 "o-dihydroxy" should be --$\underline{o}$-dihydroxy--

Col. 14, line 2 "o-dihydroxyl" should be --$\underline{o}$-dihydroxyl--

Signed and Sealed this

Twenty-seventh Day of September 1977

[SEAL]

Attest:

RUTH C. MASON
Attesting Officer

LUTRELLE F. PARKER
Acting Commissioner of Patents and Trademarks